United States Patent
McNair et al.

(10) Patent No.: US 11,454,991 B2
(45) Date of Patent: Sep. 27, 2022

(54) PATH PLANNING FOR COOPERATED AIR VEHICLES

(71) Applicant: Bell Textron Inc., Fort Worth, TX (US)

(72) Inventors: Michael McNair, Weatherford, TX (US); Juan Li, Keller, TX (US); Kip Gregory Campbell, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 127 days.

(21) Appl. No.: 16/918,596

(22) Filed: Jul. 1, 2020

(65) Prior Publication Data
US 2022/0004205 A1 Jan. 6, 2022

(51) Int. Cl.
*G05D 1/10* (2006.01)
*G08G 5/00* (2006.01)
*G01S 19/39* (2010.01)
*G08G 5/04* (2006.01)
*G05D 1/00* (2006.01)

(52) U.S. Cl.
CPC .............. *G05D 1/104* (2013.01); *G01S 19/39* (2013.01); *G05D 1/0088* (2013.01); *G05D 1/106* (2019.05); *G08G 5/0039* (2013.01); *G08G 5/0043* (2013.01); *G08G 5/04* (2013.01)

(58) Field of Classification Search
CPC ...... G05D 1/104; G05D 1/106; G05D 1/0088; G01S 19/39; G08G 5/0039; G08G 5/0043; G08G 5/04
See application file for complete search history.

(56) References Cited

U.S. PATENT DOCUMENTS 8,380,367 B2 2/2013 Schultz et al.
2018/0074520 A1* 3/2018 Liu ..................... G08G 5/0052
(Continued)

FOREIGN PATENT DOCUMENTS

KR 20200013436 A * 7/2018

OTHER PUBLICATIONS

Van den Berg, et al., "Reciprocal Velocity Obstacles for Real-Time Multi-Agent Navigation," Proceedings—IEEE International Conference on Robotics and Automation, May 19-23, 2008, Pasadena, California, 8 pages.

*Primary Examiner* — Frederick M Brushaber
*Assistant Examiner* — Elizabeth Yang
(74) *Attorney, Agent, or Firm* — Lightfoot & Alford PLLC (57) ABSTRACT

A method of autonomous flight path planning for a group of cooperating aircraft operating in formation includes: receiving information related to obstructions that interfere with an aircraft of the group continuing on a flight path; calculating a velocity obstacle for each obstruction; calculating a plurality of candidate velocities outside of the velocity obstacles; selecting a first velocity from the candidate velocities and operating a leader of the group at the first velocity; calculating, based upon keeping a follower aircraft in formation, a second velocity for the follower; determining whether the second velocity is inside one of the velocity obstacles; operating the follower at the second velocity when the second velocity is outside the velocity obstacles; and calculating a revised velocity that is outside of the velocity obstacles and operating the follower at the revised velocity when the second velocity is inside one of the velocity obstacles.

13 Claims, 9 Drawing Sheets

(56) References Cited

U.S. PATENT DOCUMENTS

2019/0236963 A1* 8/2019 High .................... B64C 39/024
2021/0300554 A1* 9/2021 Bergkvist .............. B64C 39/024
2021/0403159 A1* 12/2021 Dey ..................... G08G 5/0008

* cited by examiner

PATH PLANNING FOR COOPERATED AIR VEHICLES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The technology of unmanned aerial vehicles (UAVs) and applications for their use continues to evolve at a rapid pace. For example, drones are used for aerial photography, to fill combat roles, by hobbyists, and are contemplated for use in the delivery of goods and services and in transporting people. As UAV use continues to proliferate, available airspace will likely become increasingly congested, especially in densely populated areas.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Systems and methods for autonomous, dynamic path planning by groups of cooperating aircraft are disclosed herein. The systems and methods can be implemented by groups of cooperating aircraft operating within a formation or alternatively by groups of aircraft operating with no formation.

Figure 1:
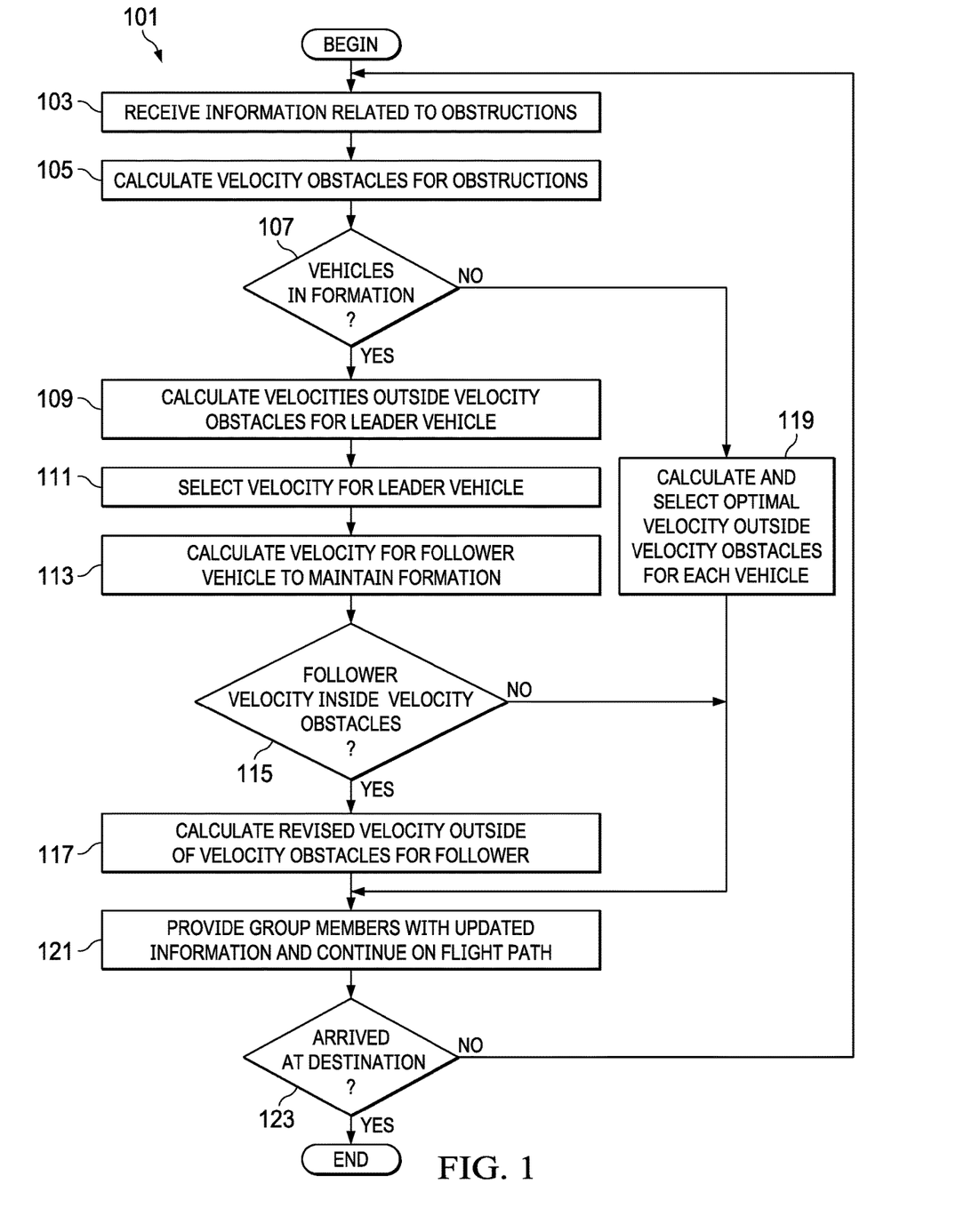
FIG. 1 is a flow chart illustrating a process of autonomous flight path planning for use by a group of cooperating aircraft to avoid obstacles by dynamically adjusting respective flight paths of the aircraft, in accordance with this disclosure.
Figure 2A:
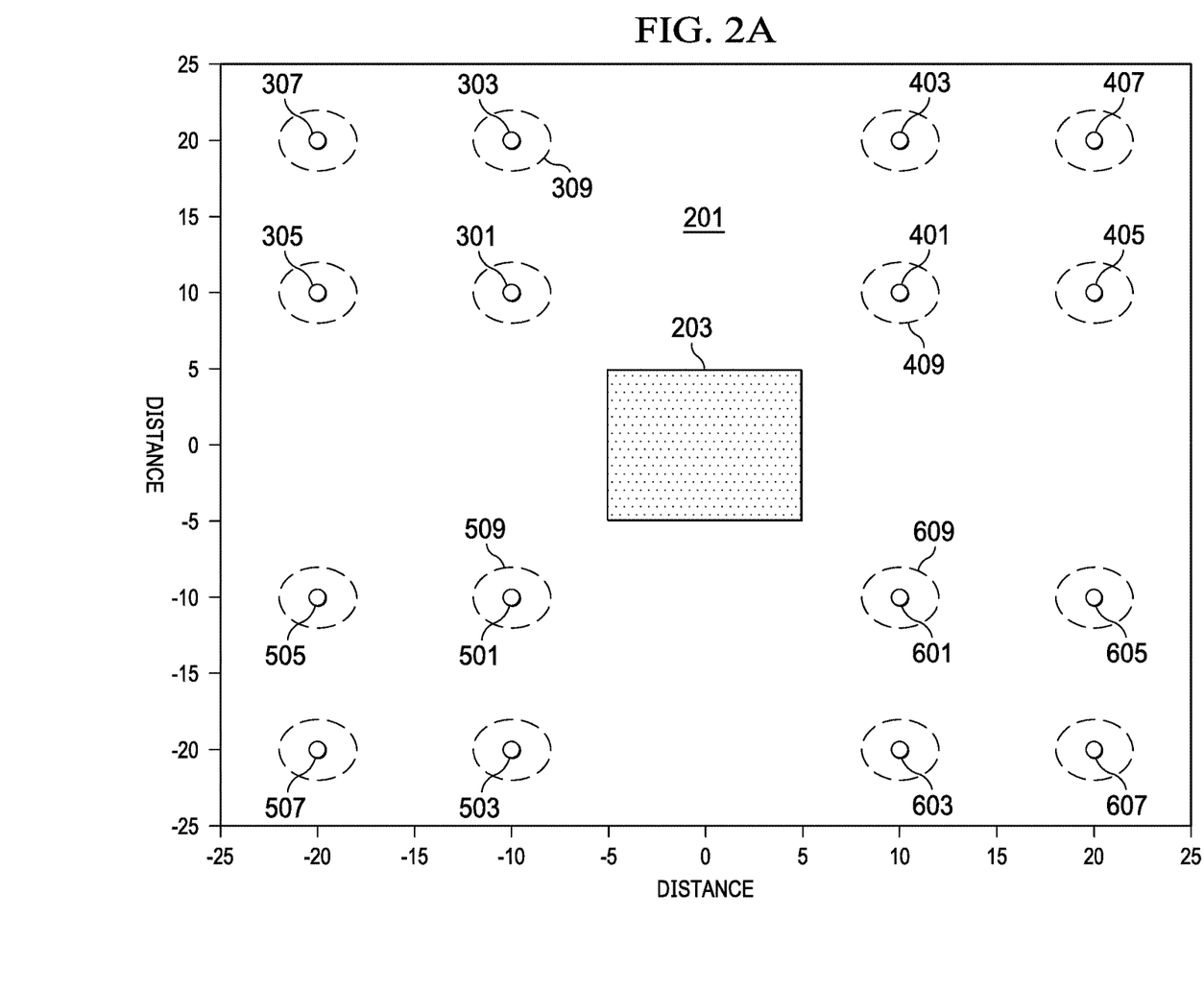
FIGS. 2A-2H are top views illustrating an example of groups of cooperating aircraft operating in accordance with the process depicted in FIG. 1.
Figure 2B:
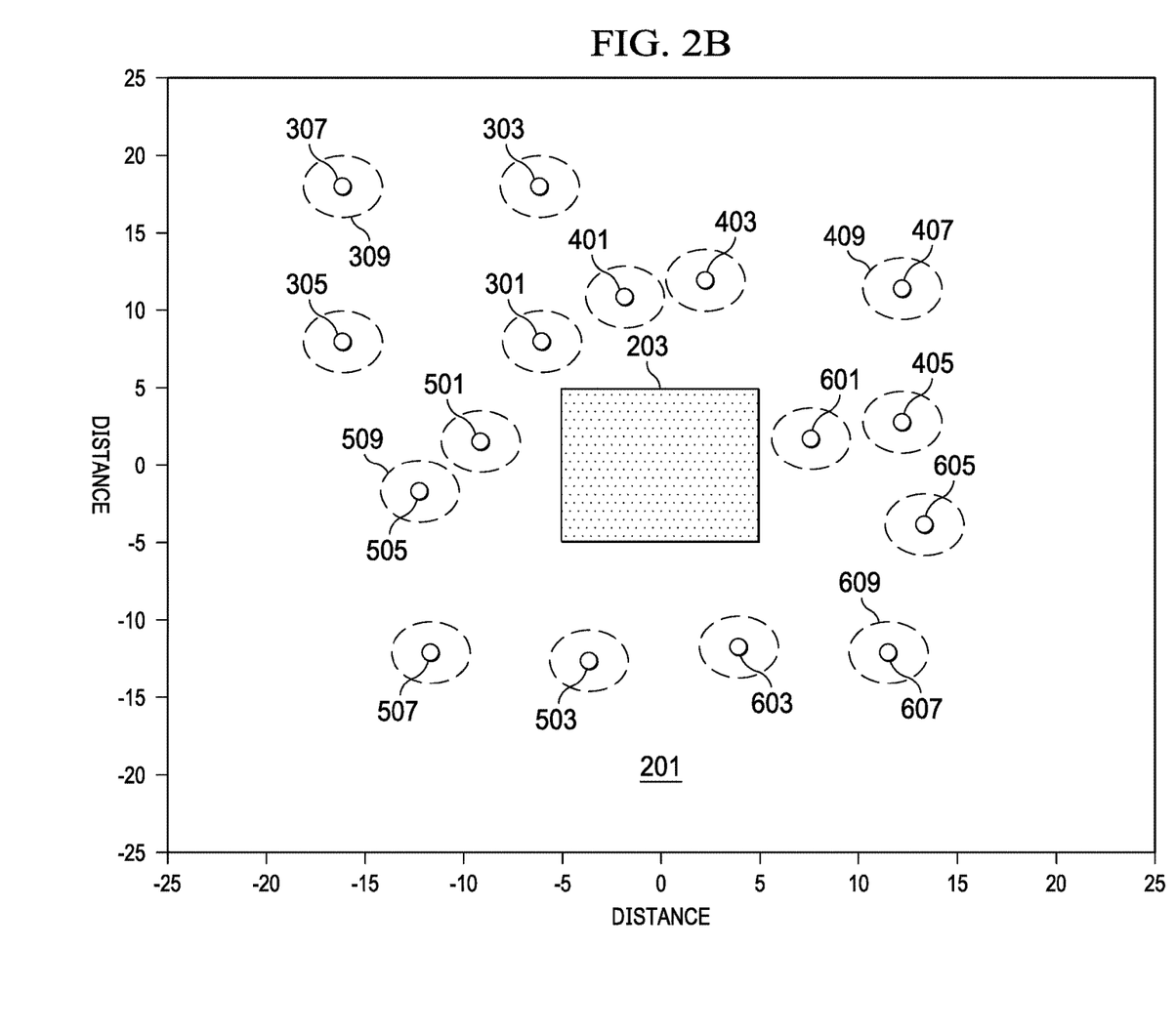
Figure 2C:
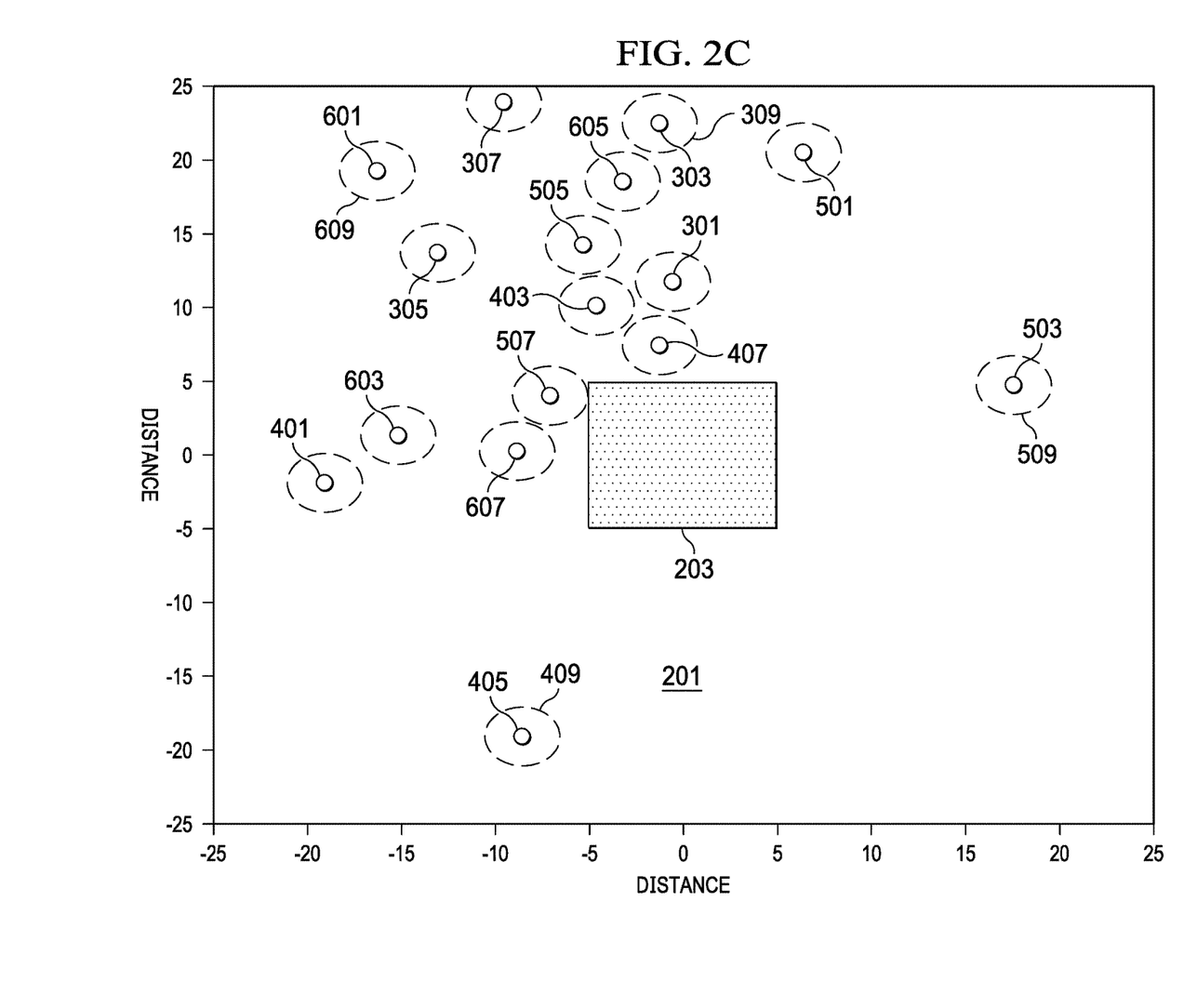
Figure 2D:
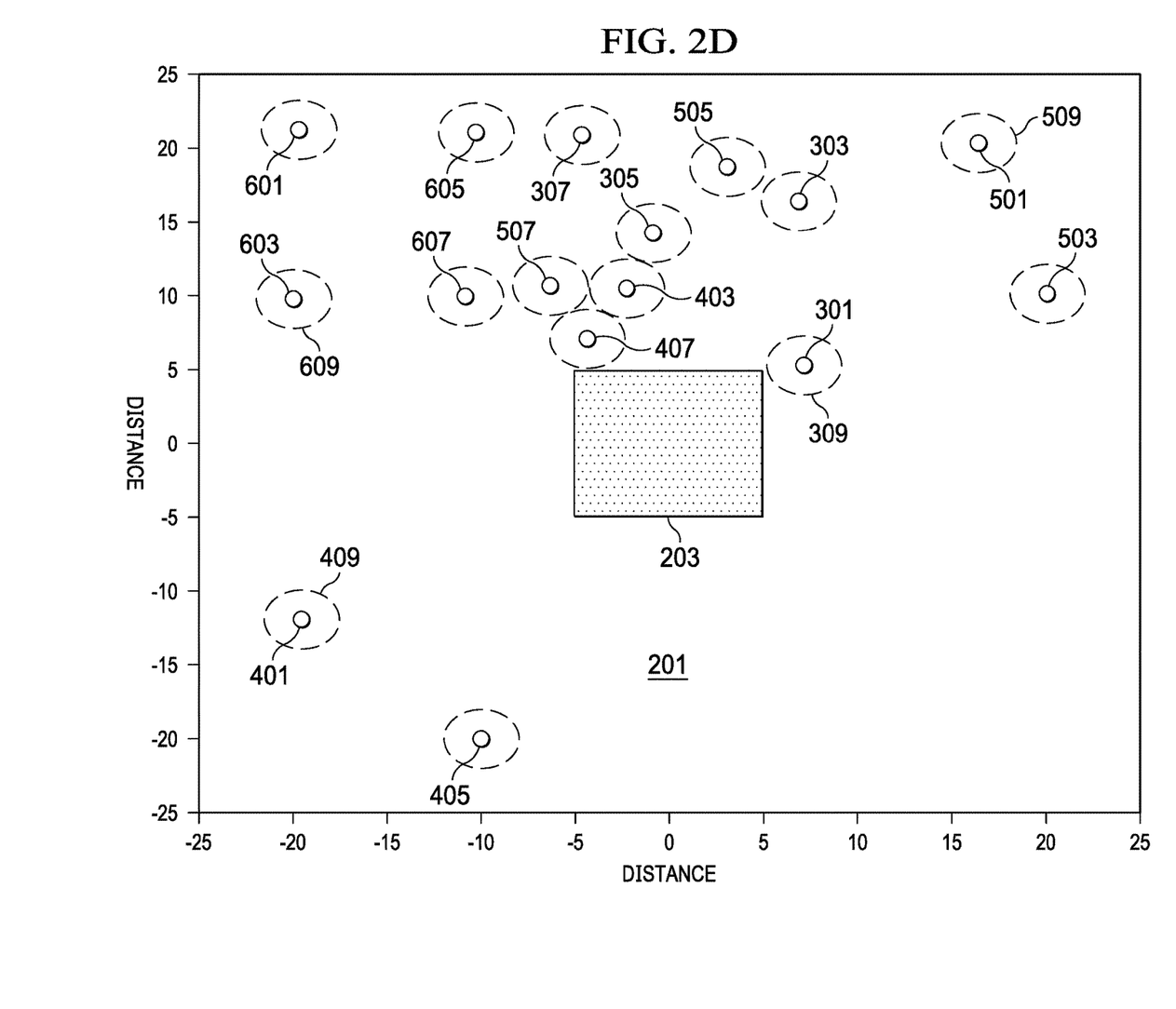
Figure 2E:
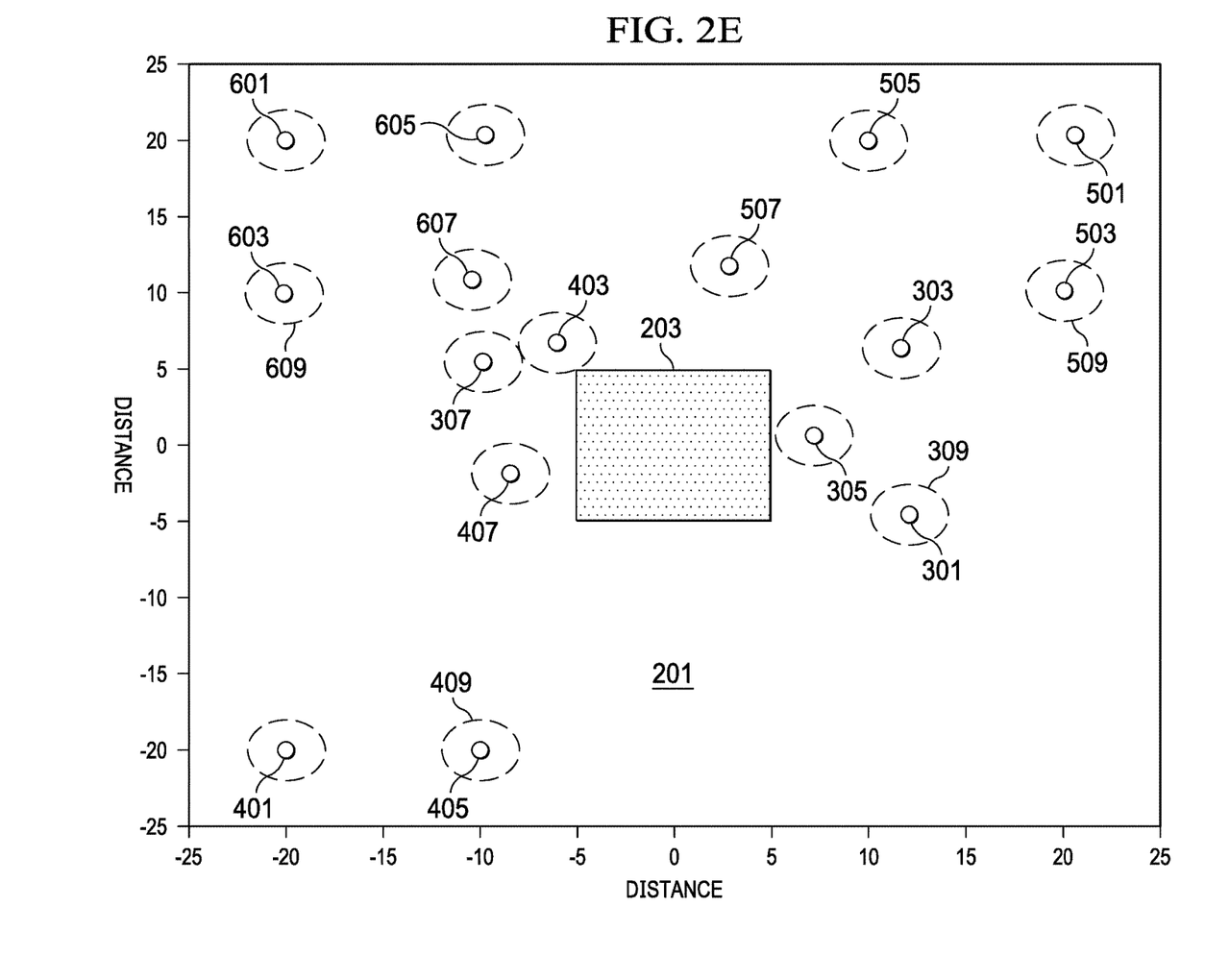
Figure 2F:
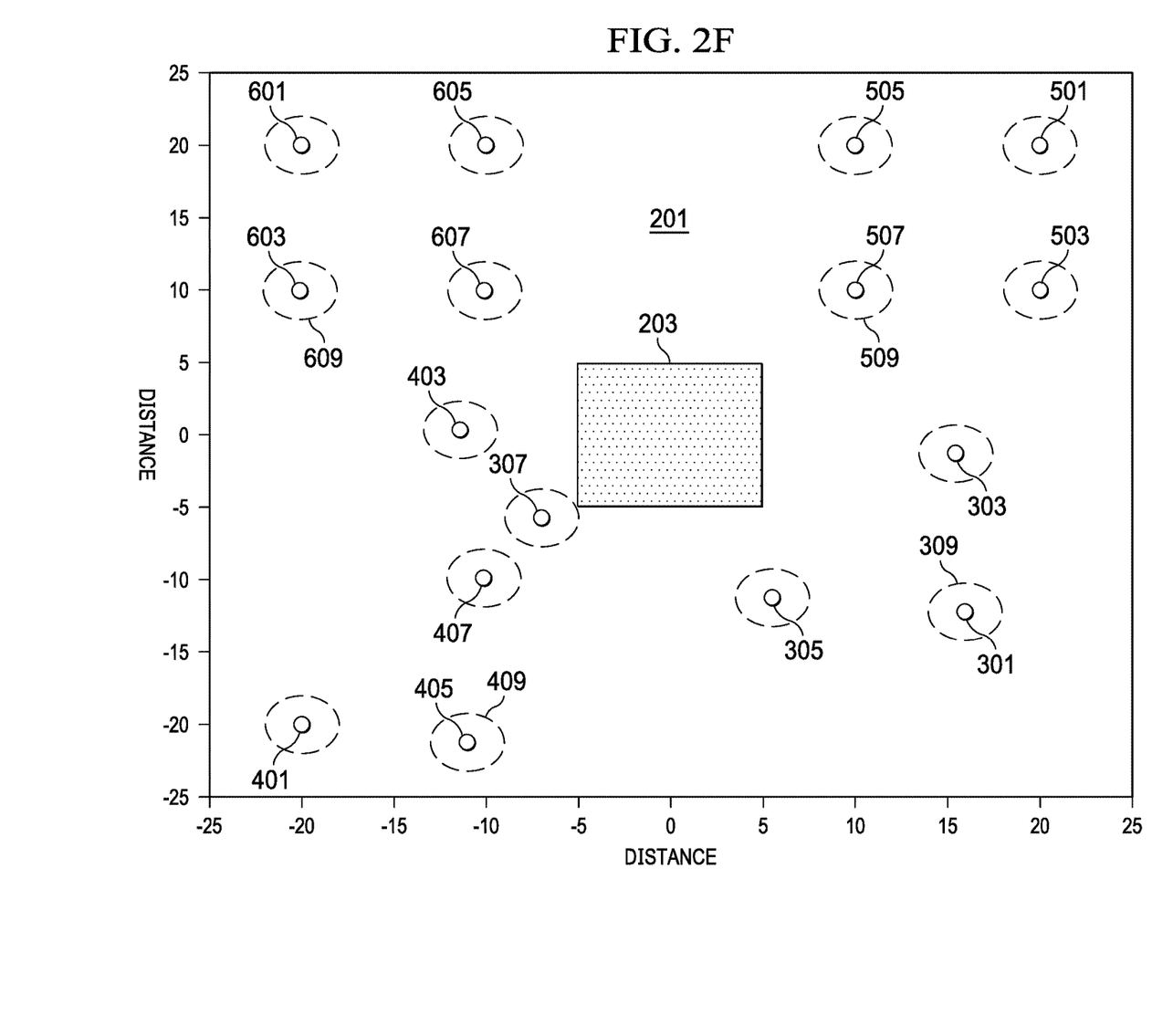
Figure 2G:
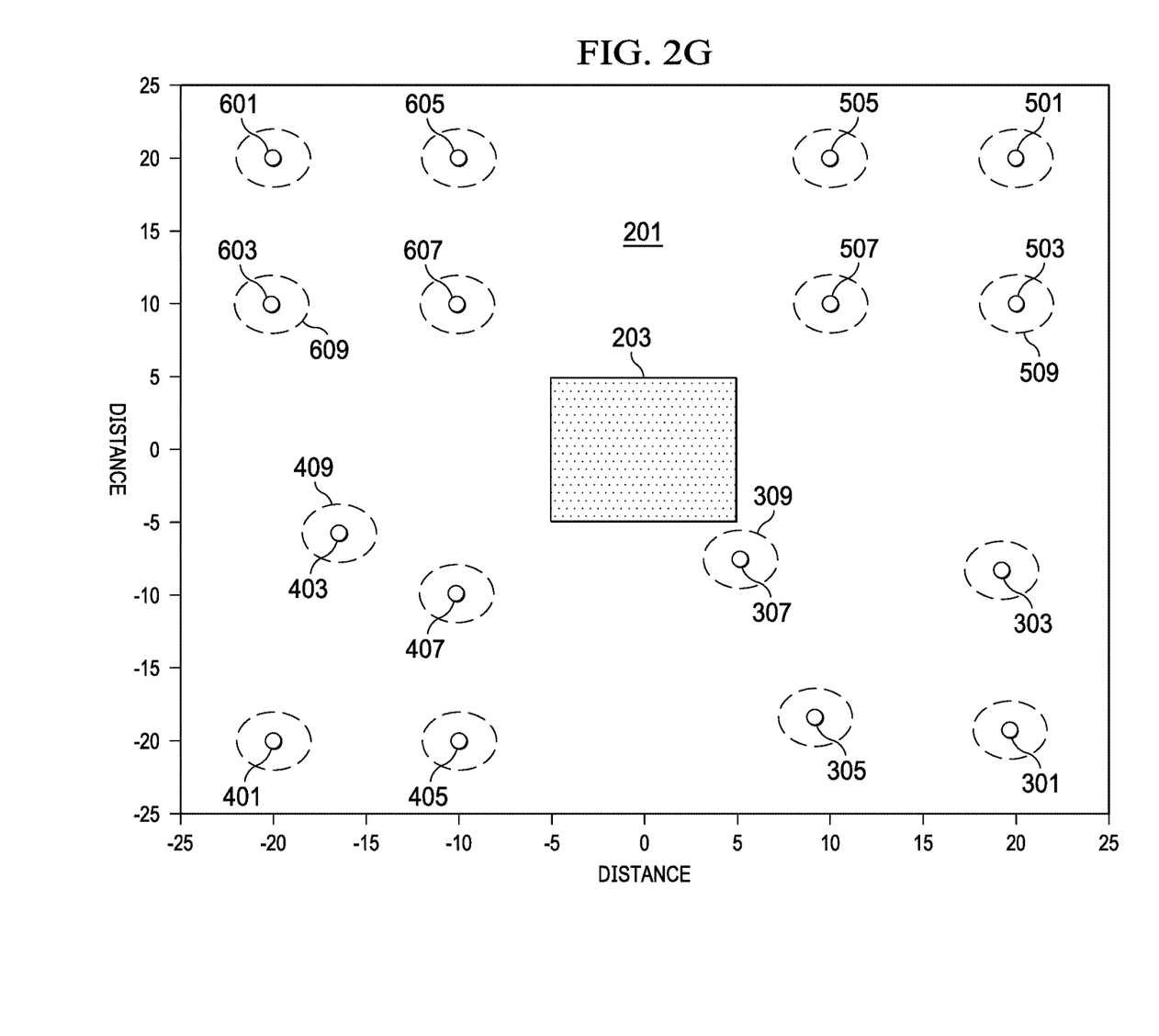
Figure 2H:
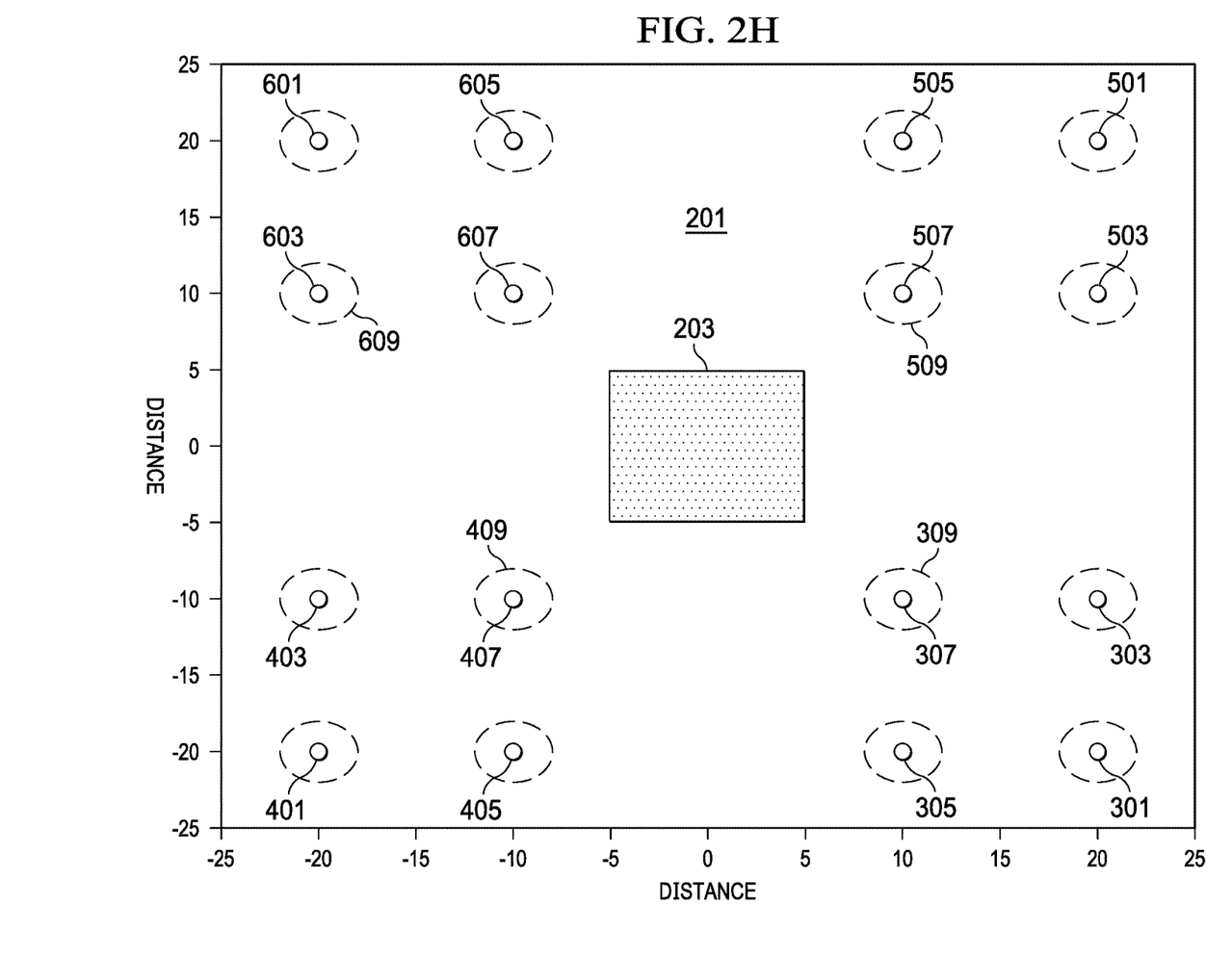

FIG. 1 is a flowchart illustrating a method 101 of autonomous flight path planning for use by a group of cooperating aircraft to avoid obstacles by dynamically adjusting respective flight paths of the aircraft, in accordance with this disclosure. Method 101 can be implemented by a number of similar aircraft that are assigned to a group. For example, method 101 can be implemented by a group of identically configured unmanned aerial vehicle (UAV) drones. Method 101 can additionally be implemented by a number of heterogeneous aircraft that are assigned to a group. For example, method 101 can be implemented by a group of aircraft that have differing sizes, configurations, flight capabilities, and so on.

To illustrate, method 101 may be implemented for a group of UAV aircraft that have hovering capability. Preferably, each aircraft in the group includes a control system. The control system of each aircraft is adapted to perform method 101 to avoid obstacles while attempting to follow a flight path to a destination. The control system is further adapted to perform other functions related to operation of the aircraft, for example causing the execution of one or more non-flight-related operations when the aircraft reaches the destination.

The control system preferably includes one or more sensor components. For example, sensor components may include one or more of a Global Positioning System (GPS) receiver, a light detection and ranging (LiDAR) unit, one or more cameras, a magnetometer, one or more accelerometers, an inertial measurement unit (IMU), an attitude and heading reference system (AHRS), a rate gyro, and a barometric altitude sensor. Such sensor components may be provided as high-performance micro-electro-mechanical system (MEMS) sensors, for example. The sensor components are preferably adapted to determine a current location in space of the aircraft and to sense the presence of obstructions that are likely to interfere with the aircraft following its current flight path. Based on information output by the sensor components, the control system operates flight control features of the aircraft in accordance with method 101 at appropriate times to avoid obstacles and to keep the aircraft on course relative to its flight path.

Preferably, the control system further includes a communication component that includes an antenna, a memory for storing instructions and data, and a processor. The processor is adapted to autonomously control flight of the aircraft, for example by monitoring and governing interactions between itself and other components of the control system, such as information output by the sensor components and signals or data received by the communication component, for example. The control system is preferably provided on one or more integrated chips and/or circuit boards.

The control system of each aircraft is adapted to perform a plurality of functions related to operation of the aircraft. For example, the control system is adapted to receive information corresponding to a destination that the aircraft is to fly to and to receive information related to other aircraft in the group, such as position and velocity of the other aircraft, via the communication component. The control system is further adapted to, based on information provided by the sensor components, detect obstructions in the flight path of the aircraft, to dynamically adjust the flight path of the aircraft to avoid the obstructions in accordance with method 101, and to return the aircraft to the original flight path, or to determine a revised flight path, once the obstructions have been avoided. Preferably, method 101 is embodied in computer-executable instructions that are stored in the memory of, and that are executed by the processor of, the control system of each aircraft in the group.

A mission can be defined for a group of aircraft cooperating with each other in accordance with method 101. For example, a mission may include the aircraft of the group flying from a starting location to a destination. Preferably, the mission specifies that the aircraft of the group operate in a formation while performing the mission. Alternatively, the mission may specify that the aircraft fly independently relative to one another from the starting location to the destination. One or both of the starting location and the destination are preferably provided as coordinates in three-dimensional space, such as a set of global positioning system (GPS) coordinates accompanied by a corresponding altitude.

An optimal flight path from the starting location to the destination is calculated for the group of aircraft. One or more optimization algorithms may be applied in calculating the optimal flight path. An optimization algorithm in accordance with method 101 may prioritize one or more characteristics of the flight path that may be beneficial to execution of the mission. Examples of single-characteristic optimization algorithms include: an optimization algorithm designed to determine a shortest flight distance between the starting location and the destination; an optimization algorithm designed to determine a shortest flight time between the starting location and the destination; and an optimization algorithm designed to minimize energy consumption during flight from the starting location to the destination.

It should be appreciated that method 101 is not limited to an optimization algorithm designed to prioritize a single flight path characteristic. For example, method 101 can alternatively be implemented with an optimization algorithm that emphasizes two or more characteristics of a flight path, such as shortest flight time along with minimized energy consumption. It should further be appreciated that method 101 is not limited to the example optimization algorithms described herein, and that method 101 can alternatively be implemented with other suitable optimization algorithms, for example designed to prioritize other characteristics of a flight path. Additionally, method 101 is adapted such that the optimization algorithm applied by one or more aircraft in a group can be redesigned during the performance of a mission, for example in accordance with changes in environmental parameters in an airspace that the group of vehicles is operating in.

Preferably, an optimization algorithm is selected for use in calculating an optimal flight path for a mission before the group of aircraft begin executing the mission. When the mission specifies that the aircraft of the group operate in formation, a leader aircraft is designated. The remaining aircraft of the group are designated as follower aircraft. Each follower is assigned a position within the formation, preferably at a predetermined distance and/or angular position relative to the leader.

With reference to FIG. 1, once the mission has started and the aircraft of the group are operating, for example in flight along an optimal flight path, the group of aircraft may encounter one or more obstructions in the optimal flight path. Obstructions may be static (e.g., buildings, physical infrastructure, etc.) or dynamic (e.g., other aircraft or groups of aircraft, severe weather zones, etc.). Groups of aircraft cooperating in accordance with method 101 may encounter any combination of static and/or dynamic obstructions that may interfere with one or more aircraft of the group following the optimal flight path.

At step 103, at least one aircraft of the group receives information related to one or more obstructions that will interfere with one or more aircraft of the group continuing along the optimal flight path toward the destination. Information related to an obstruction may include, for example: a location, a size, and a distance of the obstruction from one or more aircraft of the group if the obstruction is static; and a location, a size, a distance of the obstruction from one or more aircraft of the group, and a current velocity of the obstruction if the obstruction is dynamic.

In this embodiment, obstructions are sensed by one or more aircraft of the group, preferably by each aircraft of the group via the respective sensor components of the aircraft. If one or more obstructions are dynamic, respective velocities of those obstructions may be re-sensed by one or more aircraft in the group in accordance with high-frequency sensing intervals. In an alternative embodiment, obstructions may be sensed on behalf of the aircraft in the group, for example via radar, and communicated to one or more aircraft in the group. In another alternative embodiment, obstruction information sensed by a particular aircraft of the group can be communicated by that aircraft to each other aircraft in the group. If no obstructions are sensed, the aircraft in the group continue following the optimal flight path toward the destination and method 101 skips to step 123.

At step 105, respective velocity obstacles are calculated for each of the one or more sensed obstructions. In this embodiment, velocity obstacles are calculated in accordance with the techniques described in J. Van den Berg, M. Lin, & D. Manocha, *Reciprocal Velocity Obstacles for Real-Time Multi Agent Navigation,* 2008 IEEE International Conference on Robotics and Automation, pp. 1928-1935 (May 2008) (hereinafter "Van den Berg"). Velocity obstacles for each obstruction are calculated by each aircraft in the group.

At step 107, method 101 bifurcates based on whether the aircraft of the group are operating in formation. When the group of aircraft are operating in formation, method 101 proceeds to step 109. When the group of aircraft are operating without a formation, method 101 proceeds to step 119.

At step 109, one or more candidate velocities for the leader are calculated. Each candidate velocity is calculated to be outside of each of the one or more calculated velocity obstacles. In this embodiment, a plurality of candidate velocities is calculated by the leader. The candidate velocities are calculated in accordance with the techniques described in Van den Berg.

At step 111, a velocity is selected for the leader from among the plurality of candidate velocities. Preferably, the velocity is selected by the leader. The leader applies the selected velocity, thereby operating at the selected velocity, to adjust its course to avoid colliding with the one or more obstructions. In this embodiment, the velocity is selected by the leader in accordance with an optimization algorithm, for example as described elsewhere herein.

At step 113, a respective velocity is calculated for each follower based upon keeping the followers in formation relative to the leader and relative to each other. Keeping a follower in formation may comprise, for example: maintaining respective distances, such as distances between the follower and the leader and distances between the follower and one or more other followers, within an acceptable range; keeping the follower in a respective position or orientation relative to the leader and one or more of the other followers; or any combination thereof. Preferably, each follower calculates its velocity based on the position and velocity of the leader at the time the velocity is calculated.

At step 115, for each follower it is determined whether the calculated velocity for the follower is inside one or more of the calculated velocity obstacles. When the calculated velocity of a follower is outside each of the calculated velocity obstacles, the follower operates at the calculated velocity. Operating at the calculated velocity allows the follower to avoid the one or more obstructions while remaining within parameters of the formation relative to the leader. Method 101 then proceeds to step 121. When the calculated velocity of a follower is inside one or more of the calculated velocity obstacles, method 101 proceeds to step 117.

At step 117, one or more candidate velocities for the follower are calculated. Each candidate velocity is calculated to be outside of each of the one or more calculated velocity obstacles. In this embodiment, a plurality of candidate velocities is calculated by the follower. The candidate velocities are calculated in accordance with the techniques described in Van den Berg. The follower selects a revised velocity from among the plurality of candidate velocities. In this embodiment, the revised velocity is selected in accordance with an optimization algorithm, for example as described elsewhere herein. The follower applies the revised velocity, thereby operating at the revised velocity, to adjust its course to avoid colliding with the one or more obstructions. Applying the revised velocity may cause the follower to leave the formation. Method 101 then proceeds to step 121.

Returning to step 107, when the group of aircraft are operating without a formation, method 101 proceeds to step 119. At step 119, each aircraft of the group plans a respective optimal path to the destination. More specifically, one or more candidate velocities are calculated by each aircraft in the group. Each candidate velocity is calculated to be outside of each of the one or more calculated velocity obstacles. The candidate velocities are calculated in accordance with the techniques described in Van den Berg. Each aircraft selects a velocity from among its corresponding plurality of candidate velocities. In this embodiment, each aircraft selects its velocity in accordance with an optimization algorithm, for example as described elsewhere herein. Each aircraft applies its selected velocity to adjust its course to avoid colliding with the one or more obstructions. Method 101 then proceeds to step 121.

At step 121, each aircraft provides the other aircraft of the group with updated information relating to its flight status. In this embodiment, each aircraft in a group transmits information related to its velocity and its position relative to each of the other aircraft in the group. The updated information may be transmitted by the communication component of each aircraft, for example. Further at step 121, a determination may be made that the one or more sensed obstructions no longer interfere with continuing on the original optimal flight path. When this determination is made by the leader, the leader may respond by adjusting its heading to follow the original optimal flight path. When this determination is made by a follower that has left the formation, the follower may respond by adjusting its heading to return to its position within the formation and to follow the original optimal flight path. Each aircraft continues operating along its flight path and method 101 proceeds to step 123.

At step 123, it is determined whether the group of aircraft has arrived at the destination. In this embodiment, each aircraft determines, for example via its sensor components, whether its current location corresponds to the destination. When an aircraft determines that it has arrived at the destination, method 101 ends for that aircraft. When an aircraft determines that it has not yet reached the destination, method 101 returns to step 103.

It should be appreciated that performance of method 101 is not strictly limited to the framework of steps as illustrated and described herein. For example, the steps of method 101 need not be performed strictly in the enumerated order. Additionally, one or more steps of method 101 may be modified or omitted altogether as appropriate.

To illustrate, as part of the herein-described steps in which velocities are calculated in accordance with method 101 by cooperating aircraft in a group, method 101 can further include defining a respective safety zone around each aircraft. Each safety zone is representative of a volume of space that envelops a corresponding aircraft, and that acts as a virtual buffer to prevent collisions among aircraft of the same or different groups. For example, as part of the steps of method 101 in which cooperating aircraft in a group select a velocity, for instance from among a plurality of calculated candidate velocities, method 101 can further include determining that a selected velocity limits or prevents overlap of the safety zone of the selecting aircraft with the respective safety zones of the other aircraft in the group. Furthermore, method 101 can be adapted such that cooperating aircraft in a group impute safety zones onto dynamic obstructions that are sensed, such as other aircraft, when selecting velocities.

It should further be appreciated that method 101 is not limited to being performed by autonomous aircraft. For example, a portion or the entirety of method 101 can be adapted for performance as part of an auto-pilot feature of a piloted aircraft. It should further still be appreciated that while the instant disclosure describes and illustrates implementing method 101 for groups of autonomous, cooperating aircraft, that portions or the entirety of method 101 can be adapted for use in other types of vehicles, including autonomous or piloted land-based vehicles such as cars, trucks, or the like and autonomous or piloted marine craft such as boats, submersibles, or the like.

FIGS. 2A-2H are top views illustrating an example of groups of cooperating aircraft operating in an airspace 201 in accordance with method 101. As shown, four groups of cooperating aircraft are operating in airspace 201. The first group of aircraft includes aircraft 301, 303, 305, and 307 that are operating in formation, with aircraft 301 operating as a leader of the formation and aircraft 303, 305, and 307 operating as followers of aircraft 301. The second group of aircraft includes aircraft 401, 403, 405, and 407, the third group of aircraft includes aircraft 501, 503, 505, and 507, and the fourth group of aircraft includes aircraft 601, 603, 605, and 607. In this example, each of the second, third, and fourth groups of aircraft are operating without a formation. As shown, the aircraft in each of the first, second, third, and fourth groups have defined safety zones 309, 409, 509, and 609, respectively.

FIGS. 2A-2H are sequential views illustrating collision avoidance and path planning, in accordance with method 101, by the aircraft in the first, second, third, and fourth groups within airspace 201, throughout an interval of time as each group of aircraft performs a corresponding mission. The respective missions for each group of aircraft result in the aircraft of the first group exchanging positions in airspace 201 with the aircraft of the fourth group and in the aircraft of the second group exchanging positions in airspace 201 with the aircraft of the third group, while dynamically path planning to avoid collisions. The mission of the aircraft in the first group further specifies that aircraft 301, 303, 305, and 307 operate in a diamond formation, and retain that formation whenever possible. It should be appreciated that method 101 is not limited to grouping aircraft in a diamond formation, and that aircraft in a group can alternatively operate in accordance with method 101 in any other suitable formation.

Airspace 201 is depicted in FIGS. 2A-2H from a top-down perspective, with the graph axes indicating increments of left-to-right and forward-to-back distances relative to the aircraft operating therein. Airspace 201 includes a static obstruction 203 in the form of a physical structure, having a rectangular cross-section, that extends along an up-and-down direction relative to the aircraft therein, perpendicularly into and out of the page. During performance of their respective missions, the groups of aircraft operating in airspace 201 are adapted to perform dynamic path planning in accordance with method 101 to avoid colliding with obstruction 203 and with each other. For the purposes of simplifying the illustration in FIGS. 2A-2H, the aircraft in the first, second, third, and fourth groups are depicted as selecting velocities during dynamic path planning such that the aircraft maneuver in left-to-right and/or forward-to-back directions, or combinations thereof, to avoid collisions. However, it should be appreciated that groups of cooperating aircraft operating in a shared airspace may perform dynamic path planning in accordance with method 101 that results in the aircraft selecting velocities along any combination of left-to-right, forward-to-back, and/or up-and-down directions relative to obstructions in the airspace.

As shown, the aircraft in the second, third, and fourth groups, are operating in airspace 201 with no formation. Accordingly, each aircraft in the second, third, and fourth groups performs individual path planning to determine an optimal flight path from its starting location to its destination. Aircraft in the first group are operating in a diamond formation, with aircraft 301 assigned as the leader. Accordingly, aircraft 301 calculates an optimal path to the destination, and aircraft 303, 305, and 307 perform path planning based on remaining in formation with aircraft 301, with exception where path planning results in leaving the formation to avoid a collision. For example, as seen in FIGS. 2E-2H, path planning by aircraft 307 in accordance with method 101 causes aircraft 307 to temporarily leave the formation to avoid obstructions.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of autonomous flight path planning for a group of cooperating aircraft operating in a formation, the method comprising:
   receiving information related to one or more obstructions that interfere with an aircraft of the group continuing on a flight path toward a destination;
   calculating a respective velocity obstacle for each of the one or more obstructions;
   calculating a plurality of candidate velocities, each candidate velocity outside of the calculated velocity obstacles;
   selecting a first velocity for a leader aircraft of the group from among the plurality of candidate velocities;
   operating the leader at the first velocity;
   calculating, based upon keeping a follower aircraft in formation relative to the leader, a second velocity for the follower;
   determining whether the second velocity is inside one of the calculated velocity obstacles;
   when the second velocity is outside the calculated velocity obstacles, operating the follower at the second velocity;
   when the second velocity is inside one of the calculated velocity obstacles, calculating a revised velocity that is outside of the calculated velocity obstacles and operating the follower at the revised velocity; and
   operating the follower to leave the formation without receiving instructions to do so from the leader and to return to the formation without receiving instructions to do so from the leader.

2. The method of claim 1, wherein receiving information comprises one or more aircraft of the group sensing the one or more obstructions.

3. The method of claim 1, wherein the first velocity is selected in accordance with an optimization algorithm related to performance of a mission by the group.

4. The method of claim 3, wherein the optimization algorithm is based upon at least one of a shortest flight distance between a current location of the group and the destination, a shortest flight time from the current location to the destination, and minimizing energy consumption during flight from the current location to the destination.

5. The method of claim 1, wherein operating the follower at the revised velocity causes the follower to leave the formation.

6. The method of claim 5, further comprising:
   determining that the one or more sensed obstructions no longer interfere with the aircraft of the group continuing on the flight path; and
   causing the follower to return to the formation in response to that determination.

7. The method of claim 1, further comprising:
   providing each aircraft in the group with updated information related to the other aircraft in the group.

8. The method of claim 7, wherein the providing the updated information comprises each aircraft in the group transmitting information related to its respective velocity and position to each of the other aircraft in the group.

9. The method of claim 1, further comprising:
   defining a respective safety zone for each aircraft in the group, each safety zone enveloping a corresponding one of the aircraft.

10. The method of claim 9, wherein selecting the first velocity includes determining that the first velocity limits overlap of the respective safety zones of the leader and the follower.

11. The method of claim 9, wherein calculating the second velocity includes determining that the second velocity limits overlap of the respective safety zones of the follower and the leader.

12. The method of claim 1, further comprising:
defining a mission for the group, the mission including a starting location and a destination; and
calculating an optimal flight path from the starting location to the destination in accordance with an optimization algorithm.

13. The method of claim 12, wherein the optimization algorithm is based upon at least one of a shortest flight distance between the starting location and the destination, a shortest flight time from the starting location to the destination, and minimizing energy consumption during flight from the starting location to the destination.

* * * * *